March 19, 1929.  G. E. BARNHART  1,705,893
MEANS FOR CUTTING ROTATABLE DIES FOR DRAWING MACHINES
Filed Aug. 23, 1926
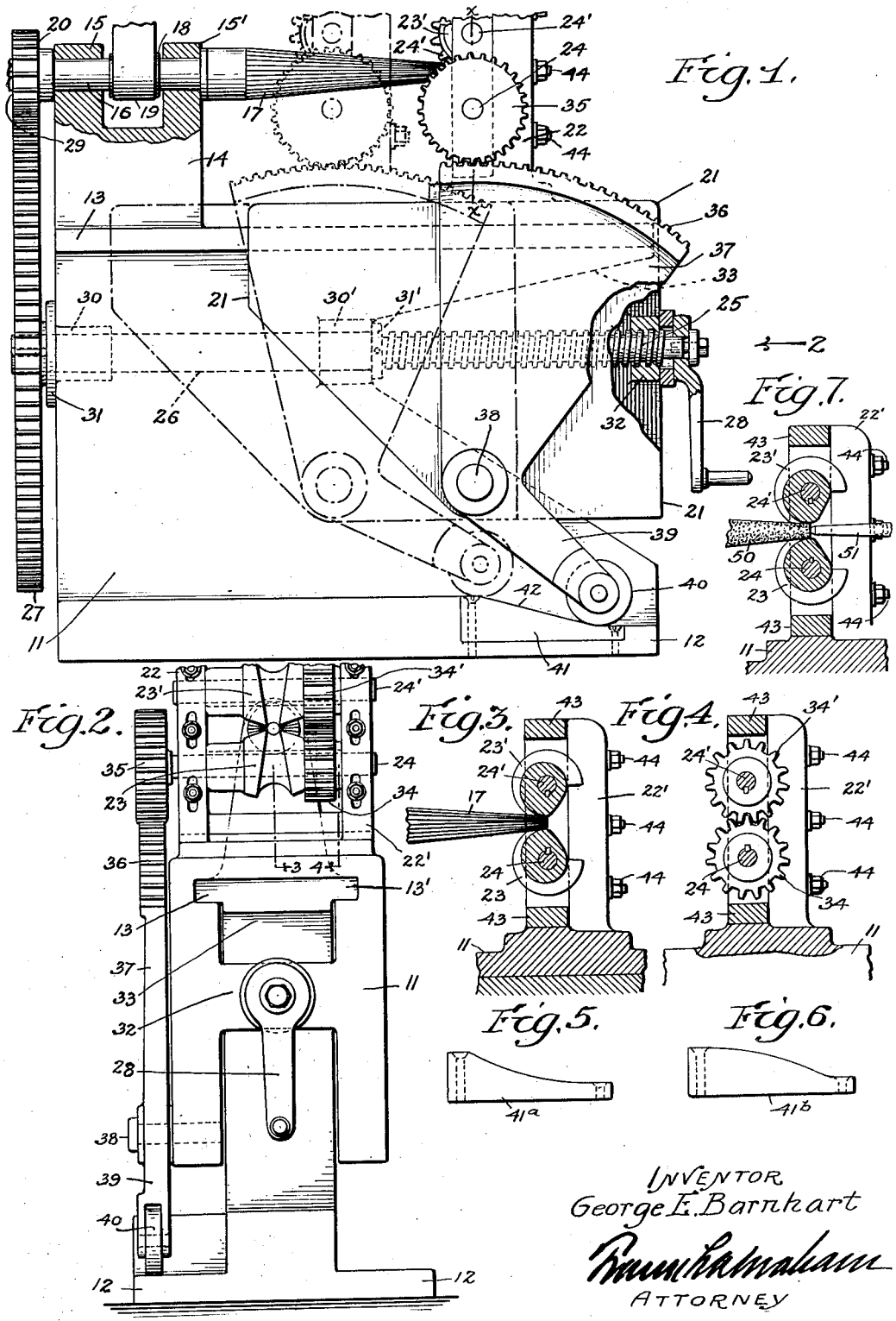
INVENTOR
George E. Barnhart
ATTORNEY Patented Mar. 19, 1929.

1,705,893

UNITED STATES PATENT OFFICE.

GEORGE E. BARNHART, OF PASADENA, CALIFORNIA.

MEANS FOR CUTTING ROTATABLE DIES FOR DRAWING MACHINES.

Application filed August 23, 1926. Serial No. 131,088.

This invention relates to the providing of nonuniform channels in the peripheral surfaces of rotatable die elements,—but it should be understood that rotatable dies, produced in the general manner herein described, may be used in any desired alternative manner; and that the mentioned peripheral channels, may be so cut as to display, when sectioned in a median plane, longitudinally of the axis thereof, a curvature corresponding to an arc of a true circle, or a curved sided figure, are intended to be non-uniform in depth, and to extend through an arc of more or less than 360° of said axis.

It is an object of my invention to provide a method of cutting rotatable dies, suitable for use in taper drawing operations, which comprises rotating a conically tapered or other cutting element upon an axis of symmetry thereof, disposing a die blank, upon a non-intersecting axis, in a plane substantially perpendicular to the axis of rotation of said cutting element; and so producing a relative movement of traverse between said die blank and said cutting element, while rotating said die blank on said non-intersecting axis, as to cut a peripheral channel of varying depth in said die blank; and, in preferred embodiments of my invention, I may provide means whereby a plurality of die blanks (as, a pair or pairs intended for concurrent use as a set) are simultaneously rotated through a complete revolution more or less during a relative advance of the same longitudinally over a conical reamer, grinder, or the like,—the desired rotation of said die blanks being automatically effected during, and in proportion to, the mentioned relative advance.

Other objects of my invention, including the provision of means for imparting rapid rotation to a reamer, grinder, or the like, means for supporting a pair of die blanks, on a die head, in a manner favorable to the simultaneous cutting or grinding of non-uniform peripheral channels therein, and including also cam means for rotating a segmental member in such manner as to revolve the mentioned die blanks slowly upon their axes during a movement of relative approach between said die blanks and a reamer, grinder, or other cutting element,—the mentioned relative approach being effected either by manual or by power means—may be best appreciated from the following description of an illustrative embodiment of my invention, taken in connection with the appended claims and the accompanying drawings, in which Fig. 1 may be referred to as a side elevational view, with parts broken away.

Fig. 2 is an end elevational view, taken substantially as indicated by the arrow 2 of Fig. 1, with parts broken away.

Figs. 3 and 4 are respectively detail sectional views, taken substantially as indicated by the lines 3—3 and 4—4 of Fig. 1.

Figs. 5 and 6 are respectively detail views showing alternative forms of cam plates, hereinafter referred to, suitable for use in the production of variably increasing channels in dies, as hereinafter described.

Fig. 7 is a fragmentary elevation of the grinder support.

Referring to the details of that specific embodiment of my invention chosen for purposes of illustration, 11 may be a main frame or body comprising a base 12, this frame or body including substantially flat guide flanges 13, 13' (for a purpose hereinafter described) a standard 14 extending thereabove and providing bearings 15, 15' for a shaft 16 carrying a grinder, reamer or other cutting element 17,—the shaft 16 being shown as provided with a sprocket or pulley 18, rotatable by a chain or belt 19, and optionally provided also with a small gear 20, for a purpose hereinafter described.

The body 11, or its equivalent, may be so shaped as to provide support for a traversing carriage 21, with which a standard or standards 22, 22' may be provided with any suitable means for the support of one or more die blanks (as, a pair of oppositely disposed die blanks 23, 23') during the movement of approach between the cutting element 17, or its equivalent, and said die blanks,—the latter being shown as supported, in a mating relationship, upon shafts 24, 24', whose axes of rotation lie in a plane perpendicular to the axis of rotation of said cutting element.

Regardless of the method by which the die blanks 24, 24' may be concurrently rotated, in opposite directions, during the mentioned movement of approach, the carriage 21, or its equivalent, may be supported mainly or exclusively by the guide flanges 13, 13', during such movement; and said movement may advantageously be effected by means such as a screw 25, extending parallel with the shaft 16 and/or the guides 13, 13',—this screw being shown as integral with a shaft 26 and as provided, at its respective ends, with a gear 27 and with a crank 28. The latter is suitable for use in causing a manually controlled advance of the carriage 21, and the former is shown as intermeshing with the small gear 20 on the shaft 16, to produce a rotation of the screw 25 incidentally to the operation of the cutting tool 17, or its equivalent.

If desired, the small gear 20 may be provided with a clutch face 29 (engageable by a cooperating face of a clutch member, not shown) which may be splined or keyed upon the shaft 16 in a known manner; the shaft 26 may be provided with replaceable bearings, somewhat as suggested at 30, 30', longitudinal movement of said shaft relatively to the main body 11 being prevented by means such as collars 31, 31'; and the screw 25 may engage a correspondingly threaded transverse web 32 integral or otherwise rigidly connected with the carriage 21, or its equivalent,—the main supporting block or body 11 being shown as cut away or chambered at 33, in such manner as to permit said carriage to advance, in the mentioned movement of approach, from such position as that in which it is shown in solid lines in Fig. 1, to such a position as that in which it is shown in dotted lines, in said figure.

In order that the described advance of the carriage 21, or its equivalent, may occasion a desired relative rotation of the die blanks 23, 23', incidentally to the described movement of approach, the respective shafts 24, 24', upon which said die blanks are mounted may be respectively provided with means (such as intermeshing gears 34, 34') for assuring proportionate rotation thereof,—such rotation being effected, incidentally to the mentioned movement of approach, by any suitable means. For the purpose last referred to, I may use, for example, a gear 35, mounted upon one of the mentioned shafts (as, the shaft 24) and engageable by an arcuate external or internal rack 36,—this rack being shown as provided upon a segmental member 37, pivoted at 38 and integral with a cam arm 39.

To occasion a pivotal movement of the segmental member 37, or its equivalent, I may employ, for example, a roller 40, upon the end of the cam arm 39, and a cooperating fixed cam element 41, so disposed as to elevate said cam arm during the horizontal advance of the pivot 38,—the result being, in case the surface 42 of the cam plate 41 is uniformly inclined (the taper of the cutting element 17 being assumed to be uniform) a corresponding graduation in the depth of cut taken by said cutting element during a gradual but partial rotation of the die blanks 23, 23', or their equivalents, incidentally to the described movement of approach.

It will be obvious that, employing means of the general character described, I may provide for the cutting of channels of varying depth in the peripheral surfaces of blanks, the distribution of cut being variable at will (as, by substitution of alternative cam plates 41ª, 41ᵇ, or the like, in case a non-uniform taper is to be produced by rotatable dies manufactured in the general manner set forth) and that, regardless of the uniformity or non-uniformity in the increase of depth of cut, the outline of a peripheral channel cut in the described manner (as viewed in elevation or in a vertical section taken as indicated by the line X—X of Fig. 1) may invariably disclose an exactly circular transverse profile of said channel.

In Figs. 2 and 3, I show the two simultaneously completed dies 24, 24' as provided with gradually deepening peripheral and complemental channels extending through arcs of about 270°, the degree depending on relation between diameter of die, diameter of article, and degree of taper effected in drawing operations, as I have found the less cut out, the stronger the curve and sometimes the better the result. The remainder of the periphery of each die is shown as cut away, to form a substantially flat surface; but it should be understood that the length and rate of increase in depth of the channels cut, as well as all absolute dimensions of the finished dies, will vary according to the intended use thereof,—a pair of said rotatable dies, concurrently completed in the described manner, being intended for uniform rotation during a drawing of tubular or other stock therethrough (by means independent of my present invention) for a tapering effect, or the like; and it should also be understood that, instead of mounting die blanks directly upon removable shafts extending through posts 22, 22', or the like, I may secure such shafts in a made-up complete die head, comprising a plate or frame 43, such as that shown as secured by bolts 44,—the construction here referred to being such as to permit a ready substitution of die heads and a rapid perfecting or restoration of the surfaces of two or more dies, intended for conjoint use, in a manner which substantially eliminates centering problems, assuring practical perfection, and permits a complete head (whether containing two dies, as shown herein, or an uneven number of dies, or four dies, not shown) to be handled as such, and without avoidably occasioning disassembly and reassembly.

After the completion of the die by the means hereinabove described, a grinder 50 of suitable form (see Fig. 7) is mounted in lieu of the reamer 17, the end of the grinder being supported on a member 51 and the operation repeated, after which the die is hardened, then ground, and finally polished.

Although I have herein described a single complete embodiment of my invention, it should be understood not only that various features thereof may be independently used but also that numerous modifications might be made by those skilled in the art to which this case relates, without the slightest departure from the spirit and scope of this invention, as the same is indicated above and in the following claims.

I claim as my invention:

1. In an organization for cutting rotatable dies, a supporting structure, a rotatable tapered cutting element mounted on said supporting structure, a movable carriage, a pair of die blanks rotatably mounted on said carriage, means for advancing said carriage toward said cutting element, and means for simultaneously rotating said die blanks during the forward movement of said carriage to cut complementary grooves in said die blanks of varying depth by engagement with said cutting element.

2. In an organization for cutting rotatable dies, a support, a rotatable cutting element mounted on said support, a movable carriage mounted on said support, shafts in said carriage, a die blank mounted on each shaft, gearing connecting said shafts, a driving gear mounted on one of said shafts, a segmental gear meshing with said driving gear, a cam arm on said segmental gear, a roller on said cam arm, a cam on said support cooperating with said roller and means for advancing said carriage toward said cutting element to bring said die blanks into engagement with said cutting element.

3. An organization of the general character described comprising: a rotatable cutting element adapted to cut channels varying in depth; means for rotating said cutting element; means for supporting a die blank rotatively upon an axis disposed transversely and externally of the axis of rotation of said cutting element; and means for occasioning a simultaneous movement of approach between said die blank and said cutting element, during rotation of said die blank, said rotatable cutting element being carried upon standards rising from a main body said die blank supporting means being slidably mounted upon said main body, and said means for simultaneous approach comprising a cam fixed on said body and segmental member movable by engagement therewith.

4. In an organization for cutting pairs of complementary rotatable dies, a supporting structure, a shaped cutting element rotatably mounted on said supporting structure, a carriage slidably mounted on said supporting structure, a pair of die blanks rotatably mounted on said carriage in position to receive said cutting element therebetween, and means for synchronously advancing said carriage, rotating said die blanks and rotating said cutting element.

In testimony whereof, I have hereunto set my hand at Los Angeles, California, this 16th day of August, 1926.

GEORGE E. BARNHART.